(12) United States Patent
Lee

(10) Patent No.: US 10,767,773 B2
(45) Date of Patent: Sep. 8, 2020

(54) CHECK VALVE

(71) Applicant: MANDO CORPORATION, Pyeongtaek-si, Gyeonggi-do (KR)

(72) Inventor: Chung Jae Lee, Gunpo-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 0 days.

(21) Appl. No.: 16/166,728

(22) Filed: Oct. 22, 2018

(65) Prior Publication Data

US 2019/0120392 A1 Apr. 25, 2019

(30) Foreign Application Priority Data

Oct. 20, 2017 (KR) .......................... 10-2017-0136221
Oct. 20, 2017 (KR) .......................... 10-2017-0136226

(51) Int. Cl.
*F16K 15/02* (2006.01)
*B60T 8/34* (2006.01)
(Continued)

(52) U.S. Cl.
CPC ............ *F16K 15/026* (2013.01); *B60T 8/341* (2013.01); *B60T 15/02* (2013.01); *B60T 17/04* (2013.01);
(Continued)

(58) Field of Classification Search
CPC ....... Y10T 137/7842; Y10T 137/86887; Y10T 137/87885; Y10T 137/7929;
(Continued)

(56) References Cited

U.S. PATENT DOCUMENTS 110,082 A * 12/1870 Snyder ..................... A62C 4/02
  48/192
373,256 A * 11/1887 Traver et al. ......... F16L 37/252
  251/149.5

(Continued)

FOREIGN PATENT DOCUMENTS

JP        2015-200333 A    1/2015
KR  10-2016-0133801 A    11/2016

*Primary Examiner* — Marina A Tietjen
*Assistant Examiner* — Frederick D Soski
(74) *Attorney, Agent, or Firm* — Morgan, Lewis & Bockius LLP

(57) ABSTRACT

Provided is a check valve installed in a bore of a modulator block having an inlet path and an outlet path to control a flow of oil in one direction, the check valve including: a valve housing provided with a path hole passing through at a central portion thereof to have an upper end and a lower end thereof open to communicate with the inlet path and the outlet path, and a flange portion protruding from a circumference of an outer surface of the valve housing such that the valve housing is fixed to the bore; a spring retainer coupled to one of the open upper and lower ends of the valve housing which is adjacent to the outlet path, and having an outlet port communicating with the outlet path; a plunger movably installed in the path hole while being elastically supported by a spring supported on the spring retainer, and configured to open or close the path hole according to an up and down movement of the plunger; and a lip seal having a lip portion interposed between the plunger and the valve housing to prevent oil from flowing backward toward the inlet path from the outlet path.

10 Claims, 12 Drawing Sheets

(51) Int. Cl.
*B60T 17/04* (2006.01)
*B60T 15/02* (2006.01)
*F16K 27/02* (2006.01)
*F16K 31/12* (2006.01)
*B60T 7/04* (2006.01)

(52) U.S. Cl.
CPC .......... *F16K 27/0209* (2013.01); *F16K 31/12* (2013.01); *B60T 7/042* (2013.01); *Y10T 137/7937* (2015.04)

(58) Field of Classification Search
CPC ......... Y10T 137/7938; Y10T 137/7937; Y10T 137/7504; Y10T 137/7559; Y10T 137/7613; Y10T 137/7857; Y10T 137/7939; F16K 15/026; F16K 27/0209; F16K 31/12; B60T 8/341; B60T 15/02; B60T 17/04; B60T 7/042
See application file for complete search history.

(56) References Cited

U.S. PATENT DOCUMENTS

| | | | | | |
|---|---|---|---|---|---|
| 1,623,431 | A | * | 4/1927 | McVoy | F01B 25/00 251/63.4 |
| 1,873,318 | A | * | 8/1932 | Eason, Jr. | F04B 53/1027 137/533.21 |
| 1,963,684 | A | * | 6/1934 | Shimer | F16K 15/063 137/329.04 |
| 2,011,547 | A | * | 8/1935 | Campbell | F04B 53/1027 137/516.29 |
| 2,116,968 | A | * | 5/1938 | Casner | F04B 53/103 137/533.23 |
| 2,143,399 | A | * | 1/1939 | Abercrombie | F04B 53/1022 137/540 |
| 2,148,850 | A | * | 2/1939 | Deakins | F04B 53/1027 137/533.23 |
| 2,163,472 | A | * | 6/1939 | Shimer | F04B 53/1027 137/516.29 |
| 2,192,425 | A | * | 3/1940 | Allen | F04B 53/1027 137/329.04 |
| 2,214,799 | A | * | 9/1940 | Sharp | F04B 53/1025 137/533.23 |
| 2,229,823 | A | * | 1/1941 | Sharp | F04B 53/1025 137/533.23 |
| 2,402,713 | A | * | 6/1946 | Volpin | F04B 53/1025 137/533.23 |
| 2,495,880 | A | * | 1/1950 | Volpin | F04B 53/1027 137/516.29 |
| 2,521,314 | A | * | 9/1950 | Therolf | F04B 53/1027 251/332 |
| 2,745,631 | A | * | 5/1956 | Shellman | F04B 53/1027 251/175 |
| 2,898,082 | A | * | 8/1959 | Von Almen | F04B 53/1027 251/333 |
| 3,053,500 | A | * | 9/1962 | Atkinson | F04B 53/1025 251/332 |
| 3,157,191 | A | * | 11/1964 | Garrett | F16K 15/026 137/332 |
| 3,324,880 | A | * | 6/1967 | Roberts | F16K 1/385 137/516.29 |
| 3,409,039 | A | * | 11/1968 | Griffin | F16K 1/385 137/516.29 |
| 3,457,949 | A | * | 7/1969 | Coulter | F16K 15/026 137/543.21 |
| 3,473,561 | A | * | 10/1969 | Svenson | F16K 15/148 137/854 |
| 3,483,885 | A | * | 12/1969 | Leathers | F16K 15/02 137/329.02 |
| 3,590,837 | A | * | 7/1971 | Jeanise | F04B 53/1022 137/15.18 |
| 3,701,361 | A | * | 10/1972 | Bunn | F16K 1/34 137/543.23 |
| 3,861,646 | A | * | 1/1975 | Douglas | B29C 45/14344 251/356 |
| 4,039,003 | A | * | 8/1977 | Cheek | F16K 15/025 137/516.29 |
| 4,076,212 | A | * | 2/1978 | Leman | F16K 1/46 137/516.29 |
| 4,215,717 | A | * | 8/1980 | Trosch | F16K 15/06 137/516.29 |
| 4,551,077 | A | * | 11/1985 | Pacht | F04B 53/1022 417/454 |
| 4,612,961 | A | * | 9/1986 | Vetter | F16K 7/10 138/89 |
| 4,687,421 | A | * | 8/1987 | Cameron | F04B 49/10 137/543.21 |
| 4,716,924 | A | * | 1/1988 | Pacht | F04B 49/10 137/327 |
| 4,913,182 | A | * | 4/1990 | Whiteside | F16K 15/025 137/543.21 |
| 4,922,957 | A | * | 5/1990 | Johnson | F16K 1/46 137/516.29 |
| 4,951,707 | A | * | 8/1990 | Johnson | F16K 1/46 137/516.29 |
| 5,052,435 | A | * | 10/1991 | Crudup | F16K 15/063 137/516.29 |
| 5,088,521 | A | * | 2/1992 | Johnson | E21B 21/01 137/516.29 |
| 5,193,579 | A | * | 3/1993 | Bauer | B41J 13/14 137/540 |
| 5,230,363 | A | * | 7/1993 | Winn, Jr. | E21B 21/01 137/512.3 |
| 5,249,600 | A | * | 10/1993 | Blume | F04B 53/1087 137/516.29 |
| 5,253,987 | A | * | 10/1993 | Harrison | F04B 53/06 137/543.19 |
| 5,345,965 | A | * | 9/1994 | Blume | F04B 53/1027 137/516.29 |
| 5,605,449 | A | * | 2/1997 | Reed | F04B 53/1022 137/454.4 |
| 5,794,651 | A | * | 8/1998 | Miller | F15B 13/0405 137/454.5 |
| 5,951,121 | A | * | 9/1999 | Takahashi | B60T 7/042 303/115.1 |
| 6,019,125 | A | * | 2/2000 | Reverberi | F04B 53/1027 137/454.6 |
| 6,039,073 | A | * | 3/2000 | Messick | F16K 15/063 137/515.7 |
| 6,125,884 | A | * | 10/2000 | Hughes | F16K 1/126 137/597 |
| 7,096,884 | B2 | * | 8/2006 | Mackal | F16K 15/028 137/540 |
| 7,222,837 | B1 | * | 5/2007 | Blume | F16K 1/385 137/516.29 |
| 7,581,560 | B2 | * | 9/2009 | Koch | F16K 15/026 137/543.19 |
| 7,591,450 | B1 | * | 9/2009 | Blume | F16K 1/34 251/332 |
| 7,641,175 | B1 | * | 1/2010 | Blume | F16K 1/385 137/516.29 |
| 7,681,589 | B2 | * | 3/2010 | Schwegman | F16K 15/063 137/15.17 |
| 8,056,577 | B2 | * | 11/2011 | Street | F17C 5/06 137/263 |
| 8,141,849 | B1 | * | 3/2012 | Blume | F16K 1/34 137/516.29 |
| 8,276,613 | B2 | * | 10/2012 | Park | F16K 15/026 137/516.25 |
| 8,448,659 | B2 | * | 5/2013 | Veit | F16K 15/025 137/111 |
| 8,801,396 | B2 | * | 8/2014 | Sundquist | F01M 1/16 123/196 R |
| 8,915,722 | B1 | * | 12/2014 | Blume | F04B 53/007 137/543.23 |
| 9,004,099 | B2 | * | 4/2015 | Kim | F04B 25/04 137/513.5 |
| 9,249,798 | B2 | * | 2/2016 | Ganguly | F04B 53/162 |
| 9,297,460 | B2 | * | 3/2016 | Stadler | F16K 7/10 |

(56) References Cited

U.S. PATENT DOCUMENTS

| | | | | |
|---|---|---|---|---|
| D754,817 S * | 4/2016 | Dille | | D23/233 |
| 9,611,943 B2 * | 4/2017 | Chen | | E03C 1/023 |
| 9,732,867 B2 * | 8/2017 | Fawcett | | F16K 17/0433 |
| 9,927,036 B2 * | 3/2018 | Dille | | F16K 1/42 |
| 10,094,376 B1 * | 10/2018 | Vicars | | F04B 7/0088 |
| 10,337,630 B2 * | 7/2019 | Apadula | | F16K 17/044 |
| 2005/0103385 A1 * | 5/2005 | Takahashi | | B67D 7/42 |
| | | | | 137/540 |
| 2005/0226754 A1 * | 10/2005 | Orr | | F04B 53/007 |
| | | | | 417/571 |
| 2006/0185738 A1 * | 8/2006 | Nishiyama | | F16L 37/40 |
| | | | | 137/543.23 |
| 2006/0185739 A1 * | 8/2006 | Niki | | F16L 37/40 |
| | | | | 137/543.23 |
| 2006/0196557 A1 * | 9/2006 | Niki | | F16K 15/026 |
| | | | | 137/543.23 |
| 2007/0028966 A1 * | 2/2007 | Feith | | G05D 16/106 |
| | | | | 137/505.25 |
| 2007/0039652 A1 * | 2/2007 | Staggs | | F04B 53/102 |
| | | | | 137/540 |
| 2010/0001579 A1 * | 1/2010 | Lee | | B60T 8/363 |
| | | | | 303/119.2 |
| 2011/0005618 A1 * | 1/2011 | Lin | | B05B 1/3006 |
| | | | | 137/516.25 |
| 2011/0076171 A1 * | 3/2011 | Park | | F04B 27/1018 |
| | | | | 417/571 |
| 2011/0079302 A1 * | 4/2011 | Hawes | | F04B 53/102 |
| | | | | 137/538 |
| 2011/0206547 A1 * | 8/2011 | Kim | | F04B 15/02 |
| | | | | 417/568 |
| 2013/0014838 A1 * | 1/2013 | Akaishi | | F01M 1/16 |
| | | | | 137/538 |
| 2013/0263932 A1 * | 10/2013 | Baxter | | E21B 43/25 |
| | | | | 137/15.01 |
| 2014/0070127 A1 * | 3/2014 | Blume | | F16K 1/42 |
| | | | | 251/359 |
| 2014/0083534 A1 * | 3/2014 | Blume | | F16K 1/36 |
| | | | | 137/565.01 |
| 2014/0166138 A1 * | 6/2014 | Bisig | | F16K 15/025 |
| | | | | 137/625 |
| 2015/0362113 A1 * | 12/2015 | Chhabra | | B23P 19/00 |
| | | | | 137/315.27 |
| 2016/0177943 A1 * | 6/2016 | Pacht | | F16K 1/42 |
| | | | | 137/565.01 |
| 2016/0215588 A1 * | 7/2016 | Belshan | | F16K 31/12 |
| 2017/0146140 A1 * | 5/2017 | Jeon | | B60T 8/341 |
| 2017/0159834 A1 * | 6/2017 | Jeon | | F16K 1/46 |

* cited by examiner

CHECK VALVE

CROSS-REFERENCE TO RELATED APPLICATION

This application is based on and claims priority under 35 U.S.C. § 119 to Korean Patent Applications No. 2017-0136221, filed on Oct. 20, 2017 and No. 2017-0136226, filed on Oct. 20, 2017 in the Korean Intellectual Property Office, the disclosures of which are incorporated herein by reference.

BACKGROUND

1. Field

The present disclosure relates to a check valve, and more specifically, to a check valve provided in a hydraulic path of an electronically controlled brake system.

2. Description of the Related Art

Generally, a brake system is provided to effectively prevent a slip phenomenon of a wheel that may occur at a time of a braking, a sudden start, or a sudden acceleration of a vehicle, and the brake system includes a plurality of solenoid valves for controlling a braking hydraulic pressure transmitted from a master cylinder to a wheel cylinder and a plurality of check valves for preventing a reverse flow of oil, the plurality of solenoid valves and the plurality of check valves installed in a modulator block having a fluid path forming a hydraulic circuit to control the braking hydraulic pressure. In recent years, there is a use of an electronic brake system in which a fluid pressure supply device for supplying a pressure to a wheel cylinder by receiving an electrical signal corresponding to a driver's braking intention from a pedal displacement sensor that detects a displacement of a brake pedal when a driver applies the brake pedal. The structure of such an electronic brake system is disclosed in Korean Patent Laid-Open Publication No. 10-2013-0092045. According to the disclosed document, an electronic braking system provided with a fluid pressure supply device is configured to operate a motor according to a pedal force of a brake pedal to generate a braking pressure. At this time, the braking pressure is generated by converting a rotational force of the motor into a linear motion to press a piston In order to control the flow of oil in one direction, a check valve is installed at a proper position on a fluid path formed in the modulator block. For example, the check valves are installed on a fluid path connecting a pressure supply device to a reservoir and a fluid path connected to an inlet valve of each hydraulic circuit. However, since such a check valve has a low sealing performance against a low pressure and a high pressure and is assembled as a single subassembly structure, there is a need to machine a fluid path according to the position of the check valve in design of the hydraulic circuit, thus the degree of freedom of design is low, having a difficulty in providing the brake system as a package.

PRIOR ART DOCUMENT

Patent Document

Korean Patent Laid-Open Publication No. 10-2013-0092045 (Publication: Aug. 20, 2013)

SUMMARY

Therefore, it is an object of the present disclosure to provide a check valve having an improved sealing performance, and a high degree of freedom of design by installing to perform a function thereof according to a previously machined hydraulic circuit without limitation on the position.

It is another object of the present disclosure to provide a large amount of flow required according to the circumstance and driving condition.

Additional aspects of the disclosure will be set forth in part in the description which follows and, in part, will be obvious from the description, or may be learned by practice of the disclosure.

Therefore, it is an aspect of the present disclosure to provide a check valve installed in a bore of a modulator block having an inlet path and an outlet path to control a flow of oil in one direction, the check valve including: a valve housing provided with a path hole passing through at a central portion thereof to have an upper end and a lower end thereof open to communicate with the inlet path and the outlet path, and a flange portion protruding from a circumference of an outer surface of the valve housing such that the valve housing is fixed to the bore; a spring retainer coupled to one of the open upper and lower ends of the valve housing which is adjacent to the outlet path, and having an outlet port communicating with the outlet path; a plunger movably installed in the path hole while being elastically supported by a spring supported on the spring retainer, and configured to open or close the path hole according to an up and down movement of the plunger; and a lip seal having a lip portion interposed between the plunger and the valve housing to prevent oil from flowing backward toward the inlet path from the outlet path.

A mounting groove may be formed on an outer circumferential surface of the plunger, the lip seal may be coupled to the mounting groove such that the lip portion comes into contact with an inner circumferential surface of the valve housing.

The path hole may be provided with a first step portion and a second portion arranged in a longitudinal direction, in which the first step portion may protrude toward the central portion to support the plunger and the second step portion may be formed to make a surface contact with the lip portion, the second step portion has a stepped surface in the form of a taper.

The plunger may be disposed in the path hole to have one end supported by the first step portion and the other end elastically supported by the spring, the one end of the plunger provided with at least one communication groove communicating with the inlet path in a radial direction with respect to the center.

When the plunger moves while compressing the spring, the lip portion may be separated from the second step portion and the communication groove may be disposed to a side of the second step portion such that the inlet path communicates with the outlet path through the path hole.

The flow path may be provided with a mounting groove, and the leap seal may be coupled to the mounting groove such that the lip portion comes into contact with the plunger, and the lip portion may be elastically deformed when oil flows from the inlet path to the outlet path, to allow a flow of oil.

The plunger may be provided with a communication hole that selectively communicates the inlet path and the outlet path according to up and down movement of the plunger.

The plunger may include: a guide portion having an inner path that is disposed in the path hole and communicates with the inlet path; and a support portion radially extending from the guide portion to be elastically supported by the spring and supported by a side of the open one end of the valve housing.

The communication hole may include a plurality of first communication holes formed along a circumference of a side surface of the guide portion to communicate with the inner path and a plurality of second communication holes formed along a circumference of an outer surface of the support portion to communicate with the path hole and the outlet port.

When oil flowing from the inlet path to the outlet path may have a low pressure, the oil is allowed to flow through the first communication hole and the lip portion, and when oil flowing from the inlet path to the outlet path has a high pressure, the plunger may move while compressing the spring such that the first communication hole communicates with the path hole and the outlet port.

The plunger may be provided with a spring support groove to stably support the spring.

The spring retainer may be provided with a spring support protrusion to stably support the spring.

A coupling groove may be formed in an outer circumferential surface of a side of the one end of the valve housing such that the spring retainer is calking-coupled to the coupling groove.

The check valve may further include a filter member coupled to the other end between the open upper and lower ends of the valve housing to filter out foreign substance of oil introduced into the inlet path.

The check valve may further include a cap fixed to the modulator block while closing the bore.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. In order to make the description of the present disclosure clear, unrelated parts are not shown and, the sizes of components are exaggerated for clarity.

Figure 1:
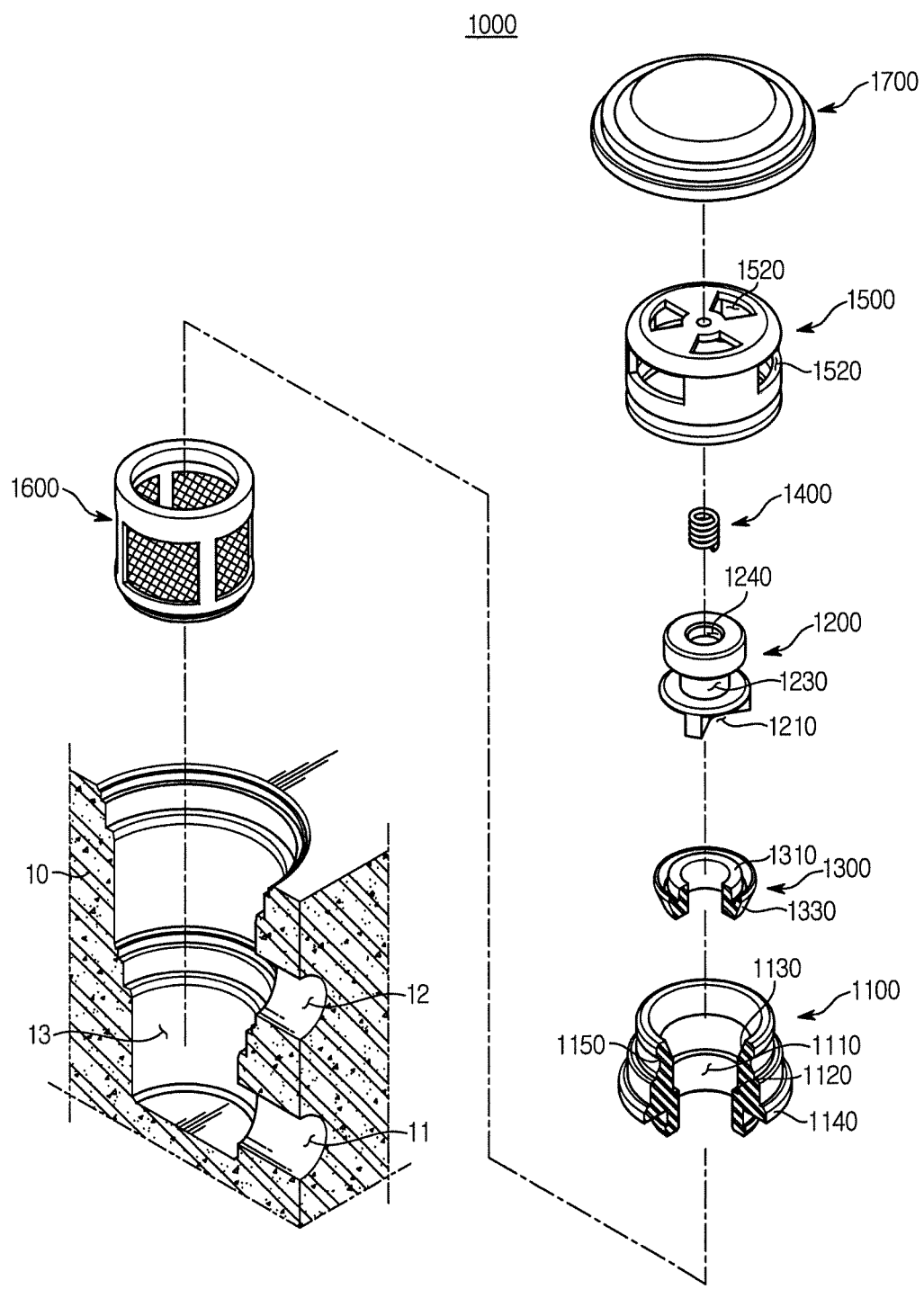
FIG. 1 is an exploded perspective view illustrating a check valve according to the first embodiment of the present disclosure, which is being assembled to a modulator block.
Figure 2:
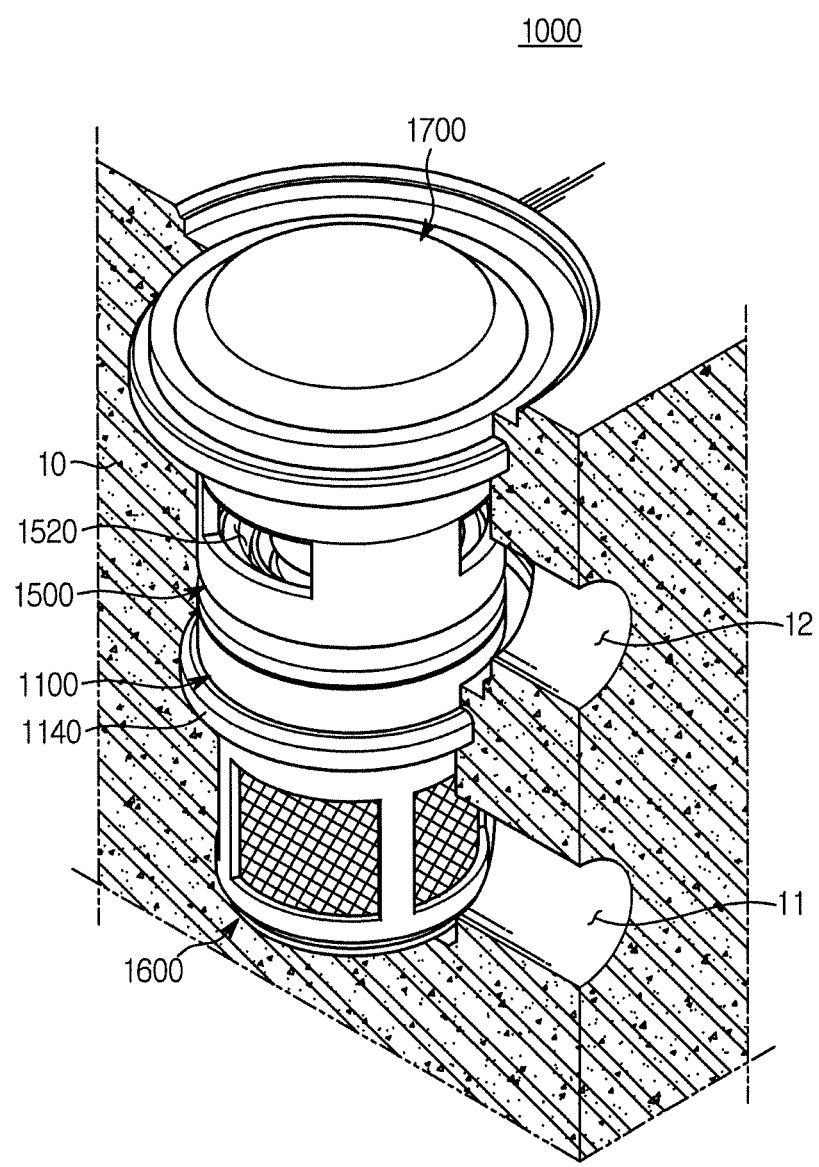
FIG. 2 is a perspective view illustrating the assembly of FIG. 1.
Figure 3:
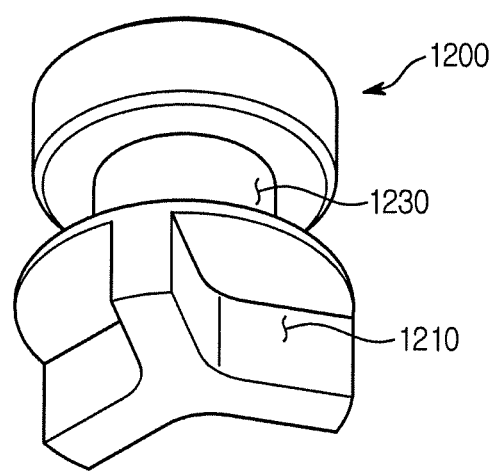
FIG. 3 is a bottom perspective view illustrating a plunger provided in the check valve according to the first embodiment of the present disclosure.
Figure 4:
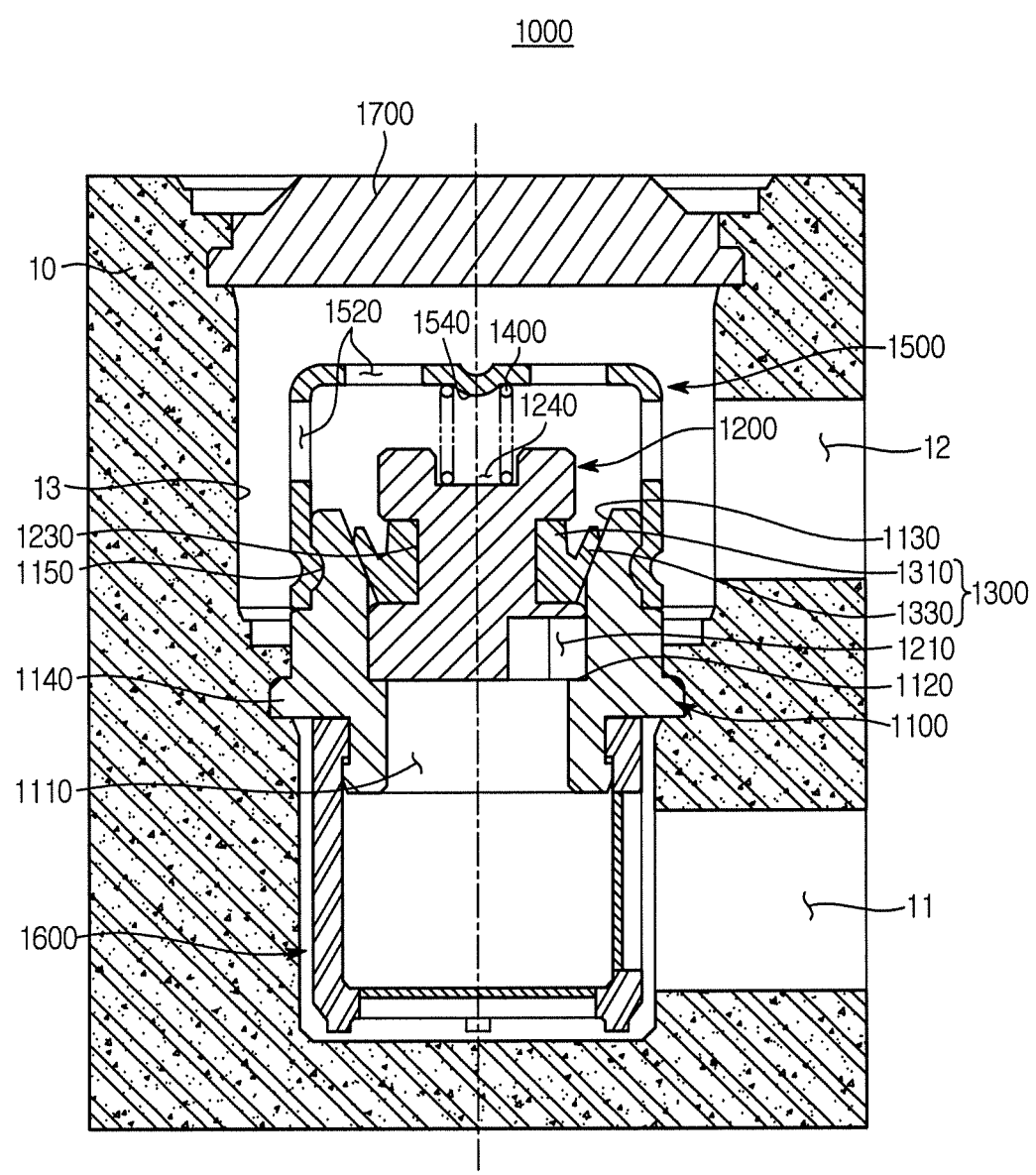
FIG. 4 is a cross-sectional view illustrating the check valve according to the first embodiment of the present disclosure.

FIG. 1 is an exploded perspective view illustrating a check valve according to the first embodiment of the present disclosure, which is being assembled to a modulator block, FIG. 2 is a perspective view illustrating the assembly of FIG. 1, FIG. 3 is a bottom perspective view illustrating a plunger provided in the check valve according to the first embodiment of the present disclosure, and FIG. 4 is a cross-sectional view illustrating the check valve according to the first embodiment of the present disclosure.

Referring to FIGS. 1 to 4, a check valve 1000 according to an aspect of the present disclosure may be mounted in a bore 13 formed in a modulator block 10 having an inlet path 11 and an outlet path 12. In this case, the check valve 1000 is mounted in the bore 13 in a state of an assembly assembled at the outside. A cap 1700 for closing the bore 13 is separately provided from the assembly and closes the bore. The check valve 1000 according to an aspect of the present disclosure is installed without being changed in the structure thereof according to the positions of the inlet path 11 and the outlet path 12 which are previously formed, to improve the degree of freedom of design. Details of the installation structure will be described below again.

The check valve 1000 includes a valve housing 1100, a plunger 1200, a lip seal 1300, and a spring retainer 1500, and is installed in the bore 13 formed in the modulator block 10 to prevent backflow of oil and control oil to flow in one direction.

The valve housing 1100 is provided in the form of a cylinder with an upper end and a lower end thereof open and having a path hole 1110 passing through a central portion thereof. The path hole 1110 communicates with the inlet path 11 and the outlet path 12 formed in the modulator block 10. In addition, a flange portion 1140 protrudes from an outer surface of the 1100 to be fixed to the 13, so that the valve housing 1100 is assembled to the bore 13 through stacking. In other words, the valve housing 1100 is introduced into the bore 13, and a part of the modulator block 10 in which the flange portion 1140 is located is deformed to surround the flange portion 1140, so that the fixing of the valve housing 1100 is achieved.

In addition, a coupling groove 1150 for coupling with a spring retainer 1500, which will be described later, is formed on an outer circumferential surface of the valve housing 1100 above the flange portion 1140.

The path hole 1110 may be opened and closed by a plunger 1200, which will be described later, and formed to be stepped in a lengthwise direction. Referring to the drawing, the path hole 1110 includes a first step portion 1120 protruding toward the central portion to support the plunger 1200 and a second step portion 1130 formed to come into contact with the lip seal 1300 installed on the plunger 120. The second step portion has a stepped surface that is inclined in a taper shape such that a diameter of the path hole 1110 increases.

The plunger 1200 is installed to be slidable upward and downward inside the valve housing 1100, and has a communication groove 1210 for selectively communicating the inlet path 11 and the outlet path 12 according to an up and down movement of the plunger 1200.

In more detail, one end of the plunger 1200 is supported by the first step portion 1120 to close the path hole 1110, and when the plunger 1200 moves, the first step portion 1120 serves to guide the plunger 1200. The plunger 1200 is provided at the one end thereof with at least one communication groove 1210 to communicate with the inlet path 11 through the path hole 1110 in a radial direction with respect to the central portion. In other words, a portion of a lower surface of the one end of the plunger 1200 except for the communication groove 1210 comes into contact with the first step portion 1120 and supported.

In addition, the other end of the plunger 1200 is elastically supported by the spring 1400. That is, a spring support groove 1240 is formed in an upper end of the plunger 1200 to support a lower portion of the spring 1400. Accordingly, the plunger 1200 is elastically supported in a direction toward the first step portion 1120.

In addition, the lip seal 1300 may be installed on the outer circumferential surface of the plunger 1200. Referring to the drawing, the lip seal 1300 is installed in a mounting groove 1230 inwardly recessed from the outer circumferential surface of the plunger 1200. The lip seal 1300 includes a body potion 1310 provided in the form of a ring shape and installed in the mounting groove 1230 and a lip portion 1330 protruding from the body portion 1310 outward while being inclined at a predetermined angle. The lip portion 1330 is provided to come into contact with the second step portion 1130. That is, the lip portion 1330 has an inclination corresponding to the tapered shape of the second step portion 1130 to make a surface contact with the inclined surface of the second step portion 1130. Accordingly, the lip seal 1300 serves to effectively prevent oil from flowing backward toward the inlet path 11 from the 12.

As the plunger 1200 moving upward while compressing the spring 1400 causes the lip seal 1300 to move upward together, the lip portion 1330 is separated from the second step portion 1130 and the one end of the plunger 1200 moves toward the second step portion 1130, and thus the path hole 1110 is opened through the communication groove 1210. In this case, a flow of oil from the inlet path 11 to the outlet path 12 is allowed.

The spring retainer 1500 is coupled to one of the one both ends of the valve housing 1100 adjacent to the outlet path 12. Referring to the drawing, the spring retainer 1500 is coupled to the upper side of the valve housing 1100. The spring retainer 1500 is provided with an outlet port 1520 that communicates with the outlet path 12. In addition, the spring retainer 1500 is provided with a spring support protrusion 1540 at an inner upper portion thereof to support an upper end of the spring 1400 that elastically presses the plunger 1200.

Meanwhile, the spring retainer 1500 is provided to surround an outer circumferential surface of an upper end of the valve housing 1100 and is calking-coupled to the coupling groove 1150 formed in the valve housing 1100. Although the coupling of the spring retainer 1500 and the valve housing 1100 is illustrated as being achieved through calking, the present disclosure is not limited thereto as long as the spring retainer 1500 and the valve housing 1100 are fixedly coupled to each other. For example, a protrusion-and-a groove coupling, or a coupling to be matched in shape through a step structure may be used.

In addition, a filter member 1600 to filter out foreign substance included in oil introduced through the inlet path 11 may be coupled to the other open end between the both open ends of the valve housing 1100, that is, the lower end of the valve housing 1100.

As described above, the valve housing 1100, the plunger 1200, the lip seal 1300, the spring retainer 1500, and the filter member 1600 may be provided as an integrated assembly assembled at the outside, and the assembly may be installed in the bore 13. After the assembly is assembled to the bore 13, the cap 1700 is coupled to close the bore 13. That is, the cap 1700 is separately provided from the assembly and is coupled to an entry of the bore 13 to close the bore 13.

The cap 1700 and the assembly are separately provided and are assembled to each other, so that the installation direction of the assembly is selectively set according to the arrangement of the inlet path 11 and the outlet path 12 formed in the modulator block 10. For example, the assembly installed between the inlet path 11 and the outlet path 12 is installed in the bore 13 such that the spring retainer 1500 is disposed at the one end of the valve housing 1100 adjacent to the outlet path 12 with respect to the flange portion 1140 of the valve housing 1100 to elastically support the plunger 1200, and the filter member 1600 is disposed at the other end of the valve housing 1100 adjacent to the inlet path 11. That is, the embodiment described with reference to FIGS. 1 to 5 illustrates the check valve 1000 installed in the modulator block 10 having a hydraulic circuit in which the inlet path 11 is formed at the lower side and the outlet path 12 is provided at the upper side.

Figure 6:
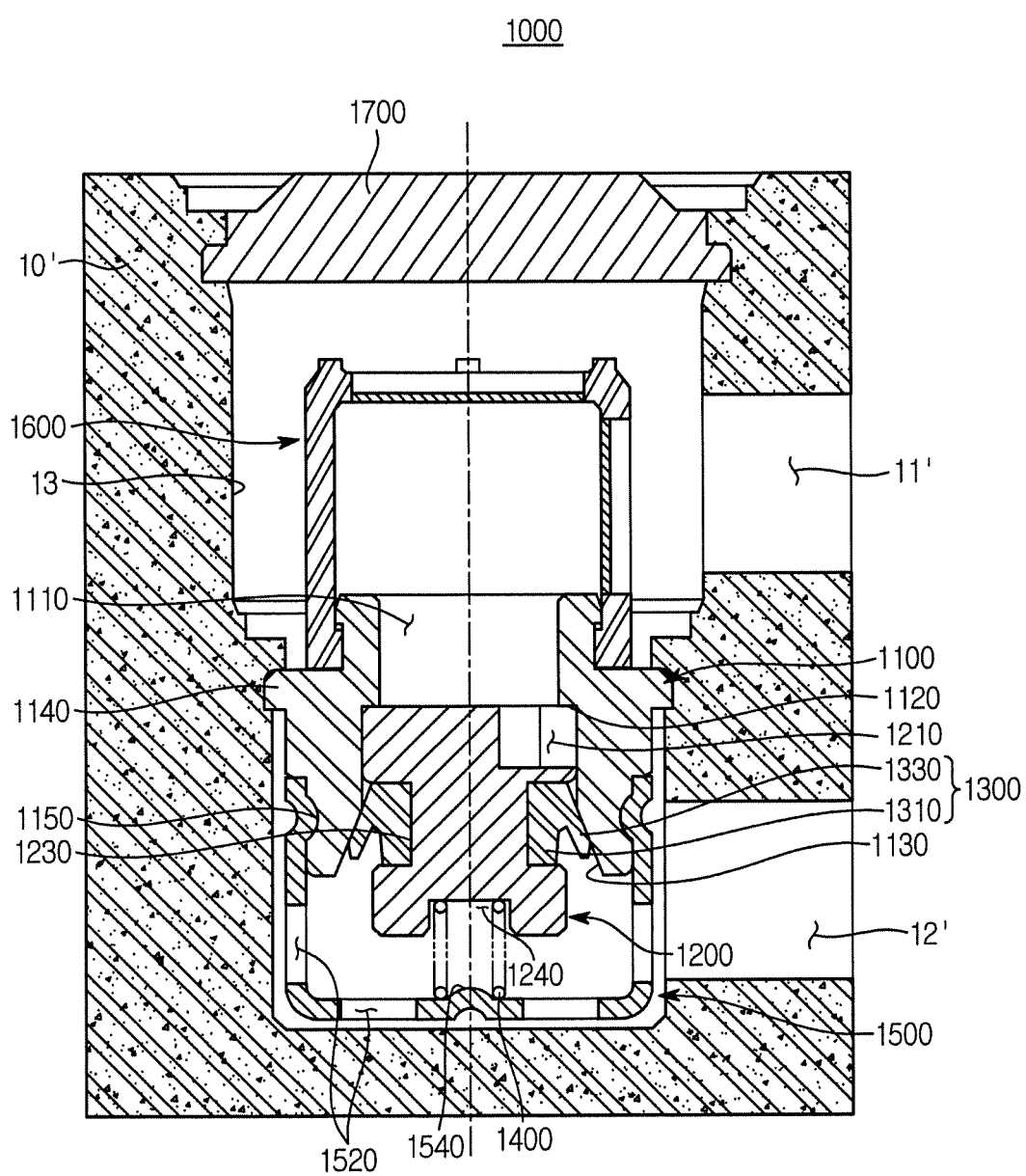
FIG. 6 is a cross-sectional view illustrating the check valve according to the first embodiment of the present disclosure assembled to a modulator block according to another embodiment in which the hydraulic circuit is changed.

FIG. 6 is a cross-sectional view illustrating the check valve according to the first embodiment of the present disclosure assembled to a modulator block according to another embodiment in which the hydraulic circuit is changed. Referring to FIG. 6, the hydraulic circuit formed in a modulator block 10' may be provided with an inlet path 11' at the upper side and with an outlet path 12' at the lower side. That is, FIG. 6 illustrates the check valve 1000 assembled to the bore 13 communicating the inlet path 11' and the outlet path 12'. Here, the same reference numerals will be assigned to the parts of the present embodiments that are identical to those according to the previous embodiment.

According to the present embodiment, the inlet path 11' formed in the modulator block 10' is located at the upper side of the bore 13 and the outlet path 12' is located at the lower side of the bore 13, and the check valve 1000 is installed in the bore 13 such that the spring retainer 1500 is disposed at the lower end of the valve housing 1100 to elastically support the plunger 1200 and the filter member 1600 is disposed at the upper end of the valve housing 1100. Accordingly, even when the inlet path 11 or 11' and the outlet path 12 or 12' are changed in the positions, the check valve 1000 is assembled to have a phase difference of 180 degrees with respect to the flange portion 1140 of the valve housing 1100 depending on the formation structure of the flow path as shown in FIGS. 4 and 6, so that the check valve 1000 is easily adapted without being changed in the structure thereof. As such, the need to machine a flow path according to the structure of the check valve is obviated, thereby improving the degree of freedom of design.

Figure 5:
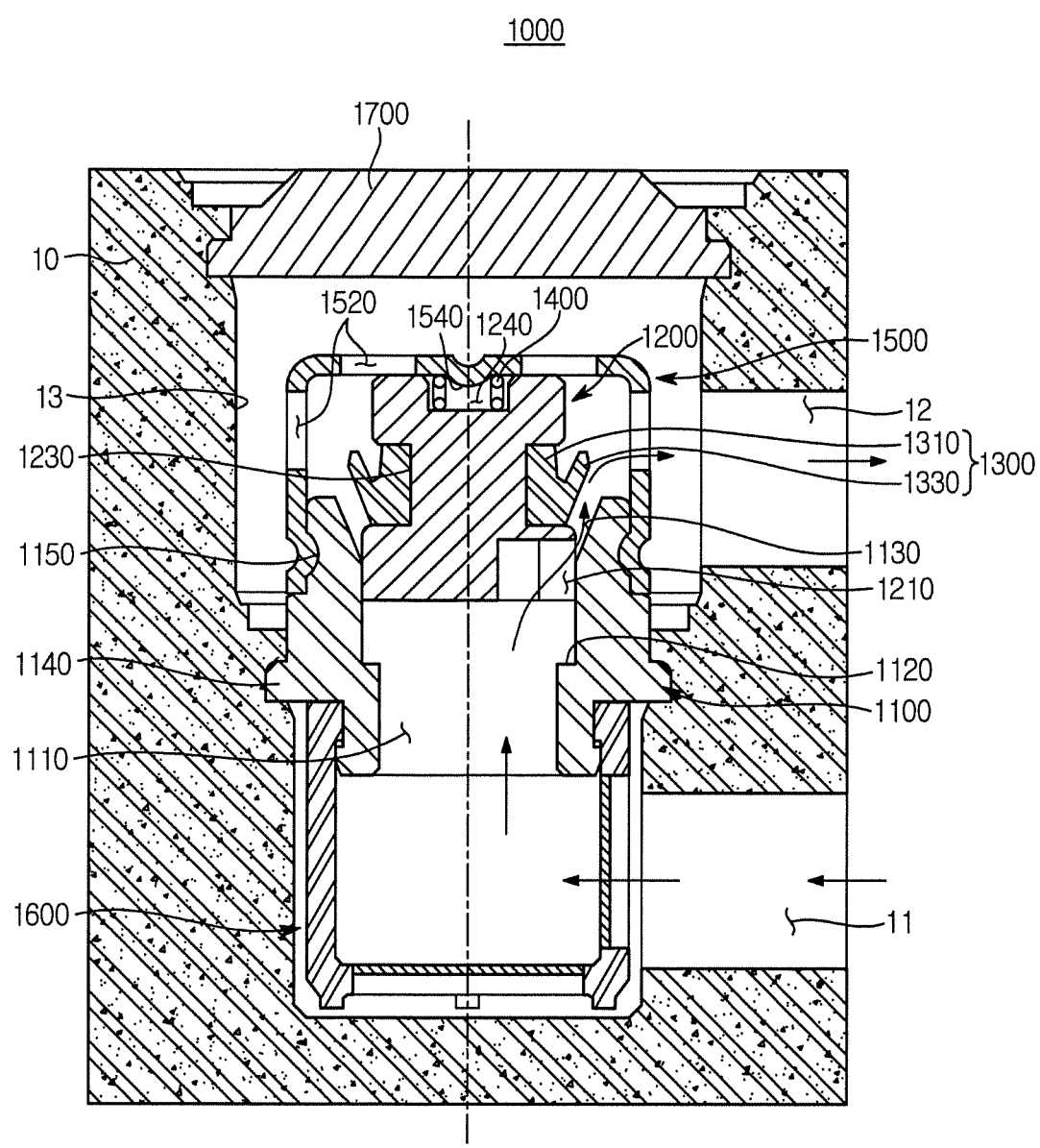
FIG. 5 is a view illustrating an operation state of the check valve according to the first embodiment of the present disclosure.

The operation state of the check valve 1000 according to an aspect of the present disclosure will be described with reference to FIGS. 4 and 5. FIG. 5 is a view illustrating an operation state of the check valve according to the first embodiment of the present disclosure.

First, referring to FIG. 5, when oil is introduced into the bore 13 through the inlet path 11 and the pressure of oil is greater than the elastic force of the spring 1400, the plunger 1200 moves upward while compressing the spring 1400. Accordingly, the lip seal 1300 installed on the outer circumferential surface is separated from the second step portion 1130, and the one end of the plunger 1200 is separated from the first step portion 1120 while being guided by the path hole 1110 and thus moves upward. In this case, the communication groove 1210 formed at the one end of the plunger 1200 is moved to be disposed to a side of the second step portion 1130 such that the path hole 1110 is opened by the communication groove 1210. Accordingly, oil introduced through the inlet path 11 is caused to flow to the outlet path 12 through the path hole 1110 and the communication groove 1210.

Then, when the pressure of oil becomes less than the elastic force of the spring 1400, the plunger 1200 is returned to the original position by the elastic restoration force of the spring 1400 to come into contact with the first step portion 1120, and the lip portion 1330 comes into close contact with the second step portion 1130 while making a surface contact with the second step portion 1130 to achieve the sealing function and prevent backflow of oil.

Figure 7:
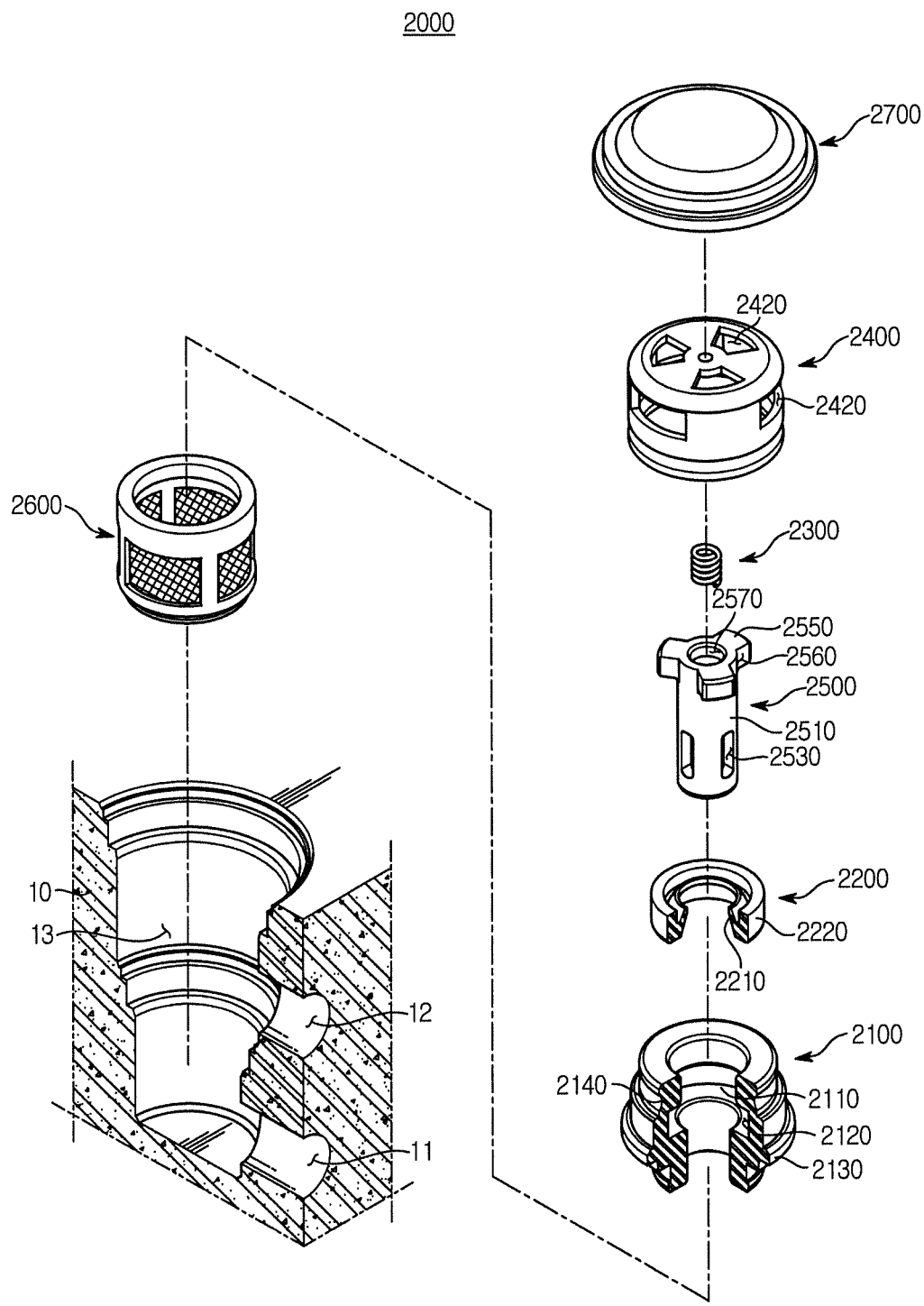
FIG. 7 is an exploded perspective view illustrating a check valve according to the second embodiment of the present disclosure, which is being assembled to a modulator block.
Figure 8:
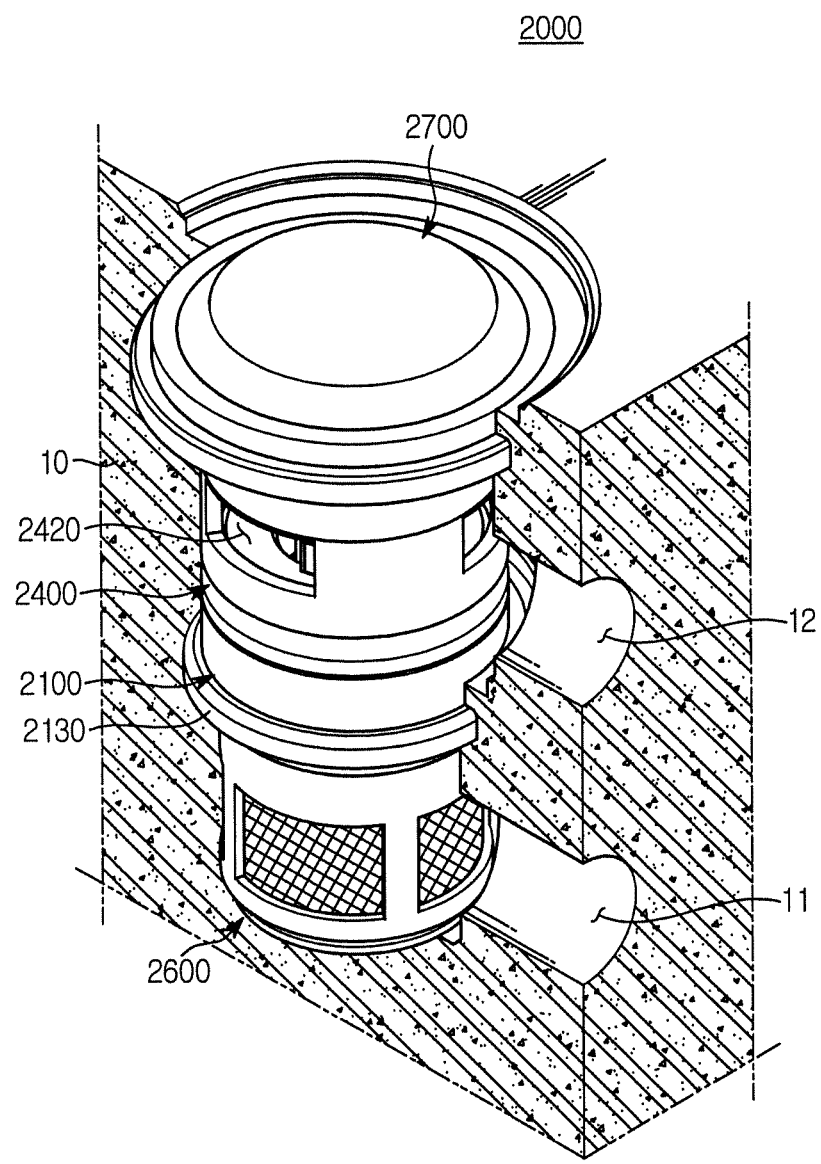
FIG. 8 is a perspective view of the assembly of the FIG. 7.
Figure 9:
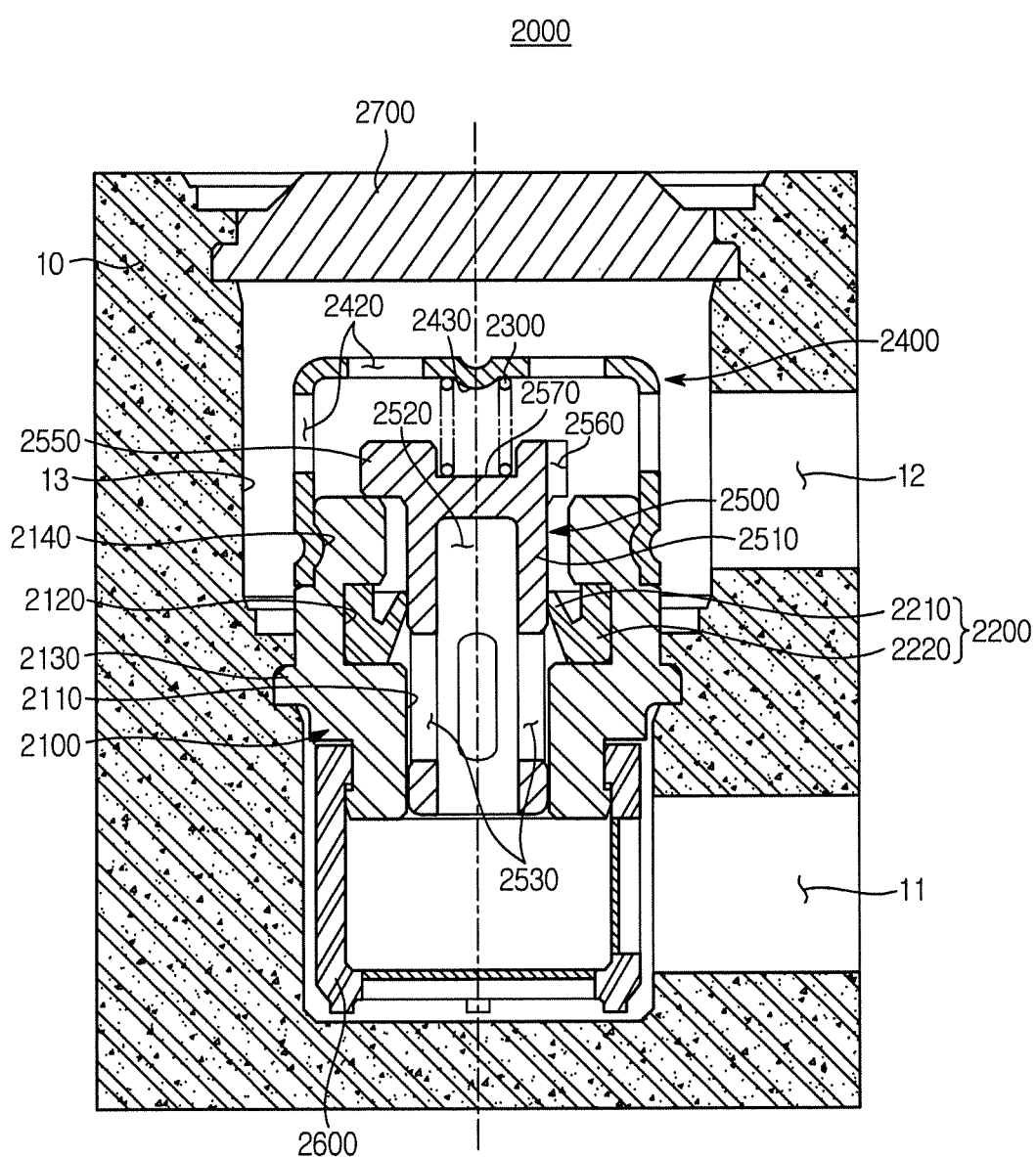
FIG. 9 is a cross-sectional view illustrating the check valve according to the second embodiment of the present disclosure.

FIG. 7 is an exploded perspective view illustrating a check valve according to the second embodiment of the present disclosure which is being assembled to a modulator block, FIG. 8 is a perspective view of the assembly of the FIG. 7, and FIG. 9 is a cross-sectional view illustrating the check valve according to the second embodiment of the present disclosure.

Referring to FIGS. 7 to 9, a check valve 2000 according to an aspect embodiment of the present disclosure may be mounted in a bore 13 formed in a modulator block 10 having an inlet path 11 and an outlet path 12. In this case, the check valve 2000 is mounted in the bore 13 in a state of an assembly assembled at the outside, and a cap 2700 for closing the bore 13 is separately provided from the assembly and closes the bore. The check valve 2000 according to the aspect of the present disclosure is installed according to the inlet path 11 and the outlet path 12, which are previously formed, to improve the degree of freedom of design. Details of the installation structure will be described below again.

The check valve 2000 includes a valve housing 2100, a lip seal 2200, a spring retainer 2400, and a plunger 2500, and is installed in the bore 13 formed in the modulator block 10 to prevent backflow of oil and control oil to flow in one direction.

The valve housing 2100 is provided in the form of a cylinder with an upper end and a lower end thereof open and having a path hole 2110 passing through a central portion thereof. The path hole 2110 communicates with the inlet path 11 and the outlet path 12 formed in the modulator block 10. In addition, a flange portion 2130 protrudes from an outer surface of the valve housing 2100 to be fixed to the bore 13, so that the valve housing 1100 is assembled to the bore 13 through stacking. In other words, the valve housing 2100 is introduced into the bore 13, and a part of the modulator block 10 in which the flange portion 2130 is located is deformed to surround the flange portion 2130, so that the fixing of the valve housing 2100 is achieved.

In addition, a coupling groove 2140 for coupling a spring retainer 2140, which will be described later, is formed on an outer circumferential surface of the valve housing 2100 above the flange portion 2130.

The lip seal 2200 may be installed inside the valve housing 2100. Referring to the drawing, the lip seal 2200 is installed in a mounting groove 2120 recessed toward the inside of the path hole 2110.

The lip seal 2200 includes a body potion 2220 provided in the form of a ring shape and installed in the mounting groove 2120 and a lip portion 2210 protruding from an inner surface of the body portion 2220 toward the central portion of the body portion 2220 while inclined at a predetermined angle. The lip portion 2210 is provided to come into contact with the plunger 2500, which will be described later, and serves to prevent oil from flowing backward toward the inlet path 11 from the outlet path 12 while allowing oil to flow from the inlet path 11 to the outlet path 12.

The spring retainer 2400 is coupled to one end of the both open ends of the valve housing 2100 adjacent to the outlet path 12. Referring to the drawing, the spring retainer 2400 is coupled to the upper side of the valve housing 2100. The spring retainer 2400 is provided with an outlet port 2420 that communicates with the outlet path 12. In addition, the spring retainer 2400 is provided with a spring support protrusion 2430 at an inner upper portion thereof to support an upper end of the spring 2300 that elastically presses the plunger 2500.

Meanwhile, the spring retainer 2400 is provided to surround an outer circumferential surface of an upper end of the valve housing 2100 and is calking-coupled to the coupling groove 2140 formed in the valve housing 2100. Although the coupling of the spring retainer 2400 and the valve housing 2100 is illustrated as being achieved through calking, the present disclosure is not limited thereto as long as the spring retainer 2400 and the valve housing 2100 are fixedly coupled to each other. For example, a protrusion-and-groove coupling, or a coupling to be matched in the shape through a step structure may be used.

The plunger 2500 is installed to be slidable upward and downward inside the valve housing 2100, and has communication holes 2530 and 2560 for selectively communicating the inlet path 11 and the outlet path 12 according to an up and down movement of the plunger 2500. In more detail, the plunger 2500 includes a guide portion 2510 having an inner path 2520 disposed in the path hole 2110 to communicate with the inlet path 11, a support portion 2550 radially extending from the guide portion 2510 to be elastically supported by the spring 2300 and supported by the open one end of the valve housing 2100, and the communication holes 2530 and 2560 formed in the guide portion 2510 and the support portion 2550, respectively. The communication holes 2530 and 2560 are divided into the first communication hole 2530 formed in the guide portion 2510 and the second communication hole 2560 formed in the support portion 2550.

The guide portion 2510 is provided in the form of a cylinder elongated in an upper side and lower side direction. The inner path 2520 is formed from the bottom of the plunger 2500 upwards. A plurality of the first communication holes 2530 are formed along a circumference of a side surface of the guide portion 2510 to communicate with the inner path 2520. The guide portion 2510 is guided inside the path hole 2110 during the up and down movement of the plunger 2500. In addition, a part of an outer circumferential surface of the guide portion 2510 is provided to come into contact with the lip portion 2210 of the lip seal 2200 to prevent backflow of oil from the outlet path 12 to the inlet path 11.

The support portion 2550 is integrally formed with the guide portion 2510 while radially extending from the guide portion 2510. The support portion 2550 is provided to be supported by the one open end of the valve housing 2100, that is, the upper end of the valve housing 2100. A plurality of the second communication holes 2560 are formed along a circumference of the outer surface of the support portion 2550. The second communication hole 2560 is formed to communicate with the path hole 2110 and an outlet port 2420. In addition, a spring support groove 2570 is provided at an upper end of the support portion 2550 to support the lower portion of the spring 2300. Accordingly, the plunger 2500 may be provided in a state of being elastically supported in a direction toward the valve housing 2100.

Meanwhile, a filter member 2600 to filter out foreign substance included in oil introduced through the inlet path 11 may be coupled to the other open end of the valve housing 2100, that is, the lower end of the valve housing 2100.

As described above, the valve housing 2100, the lip seal 2200, the plunger 2500, the spring retainer 2400, and the filter member 2600 are provided as an assembly assembled at the outside, and the assembly may be installed in the bore 13. After the assembly is assembled to the bore 13, the cap 2700 is coupled to close the bore 13. That is, the cap 2700 is separately provided from the assembly and is coupled to an entry of the bore 13 to close the bore 13.

The cap 2700 and the assembly are separately provided and assembled to each other, so that the installation direction of the assembly is selectively set according to the arrangement of the inlet path 11 and the outlet path 12 formed in the modulator block 10. For example, the assembly installed between the inlet path 11 and the outlet path 12 is installed in the bore 13 such that the spring retainer 2400 is disposed at the one end of the valve housing 2100 adjacent to the outlet path 12 with respect to the flange portion 2130 of the valve housing 2100 to elastically support the plunger 2500, and the filter member 2600 is disposed at the other end of the valve housing 2100 adjacent to the inlet path 11. That is, the embodiment described with reference to FIGS. 7 to 9 illustrates the check valve 2000 installed in the modulator block 10 having a hydraulic circuit in which the inlet path 11 is formed at the lower side and the outlet path 12 is provided at the upper side.

Figure 12:
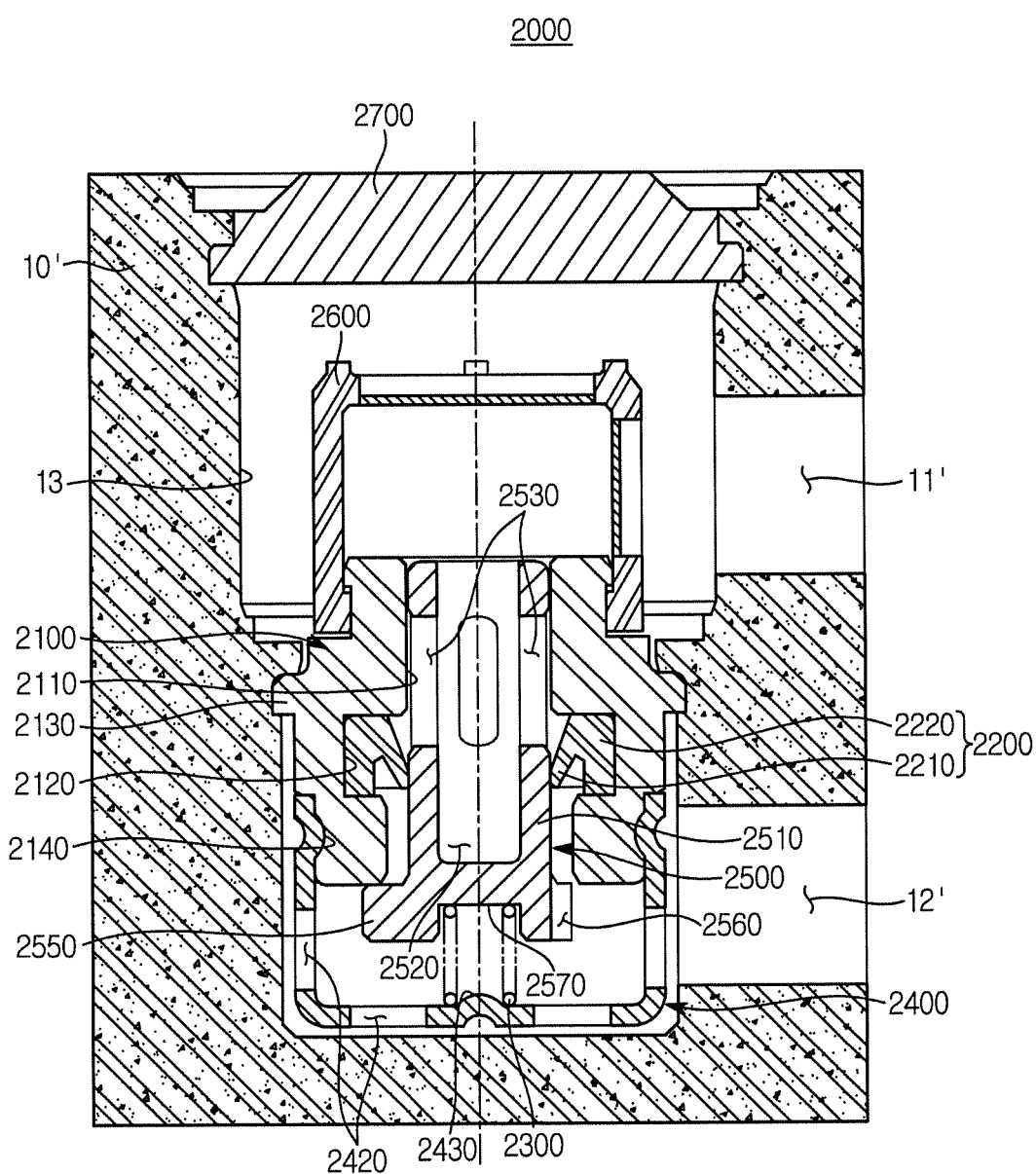
FIG. 12 is a cross-sectional view illustrating the check valve according to the second embodiment of the present disclosure assembled to a modulator block according to another embodiment in which the hydraulic circuit is changed.

FIG. 12 is a cross-sectional view illustrating the check valve according to the second embodiment of the present disclosure assembled to a modulator block according to another embodiment in which the hydraulic circuit is changed. Referring to FIG. 12, the hydraulic circuit formed in a modulator block 10' may be provided with an inlet path 11' at the upper side and with an outlet path 12' at the lower side. That is, FIG. 12 illustrates the check valve 2000 assembled to the bore 13 communicating with the inlet path 11' and the outlet path 12'. Here, the same reference numerals will be assigned to the parts of the present embodiments that are identical to those according to the previous embodiment.

According to the present embodiment, the inlet path 11' formed in the modulator block 10' is located at the upper side of the bore 13 and the outlet path 12' is located at the lower side of the bore 13, and the check valve 2000 is installed in the bore 13 such that the spring retainer 2400 is disposed at the lower end of the valve housing 2100 to elastically support the plunger 2500 and the filter member 2600 is disposed at the upper end of the valve housing 2100. Accordingly, even when the inlet path 11 or 11' and the outlet path 12 or 12' are changed in the position, the check valve 2000 is assembled to have a phase difference of 180 degrees with respect to the flange portion 2130 of the valve housing 2100 depending on the formation structure of the flow path as shown in FIGS. 9 and 12, so that the check valve 2000 is easily adapted without being changed in the structure thereof. As such, the need to machine a flow path according to the structure of the check valve is obviated, thereby improving the degree of freedom of design.

The operation state of the check valve 2000 according to an aspect of the present disclosure will be described with reference to FIGS. 9 to 11. FIG. 9 is a cross-sectional view illustrating the check valve before the operation, and FIGS. 10 and 11 are views illustrating an operation state of the check valve according to the second embodiment of the present disclosure.

Figure 10:
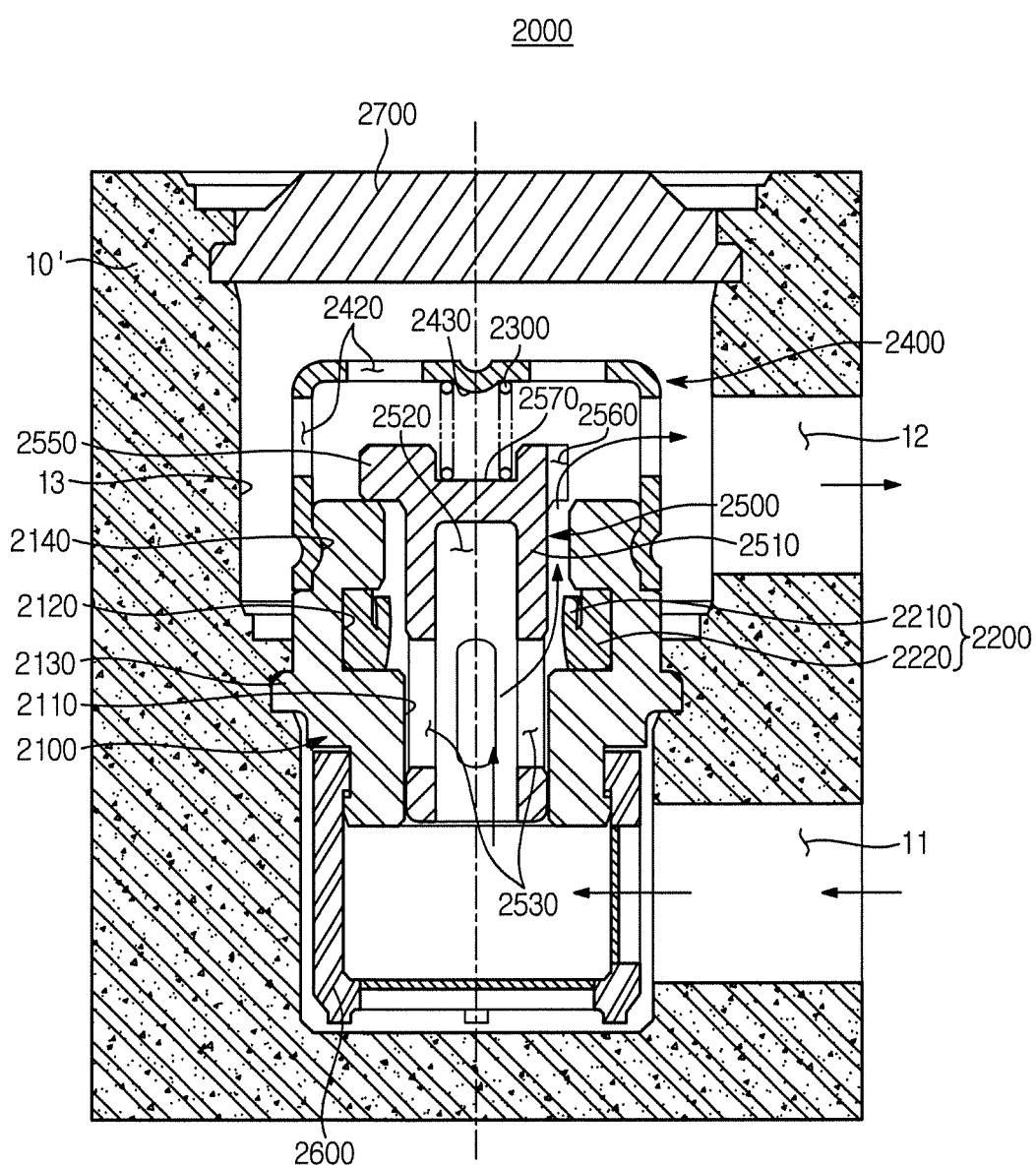
FIGS. 10 and 11 are views illustrating an operation state of the check valve according to the second embodiment of the present disclosure.
Figure 11:
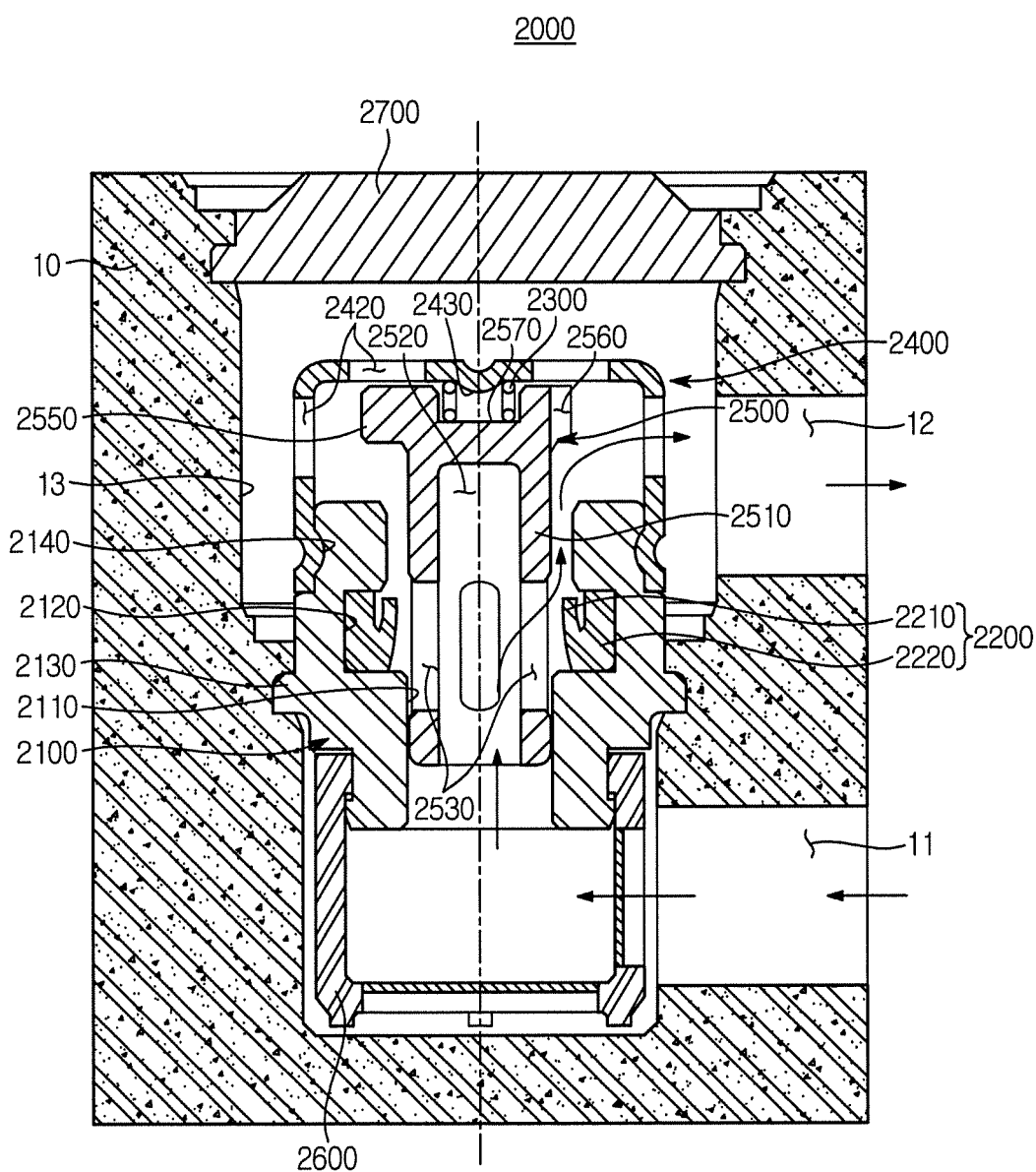

First, referring to FIG. 10, when oil is introduced into the bore 13 through the inlet path 11 and the pressure of oil is less than the elastic force of the spring 2300, that is, in a low pressure condition, the plunger 2500 does not move. In this case, oil flows through the inner path 2520 and the first communication hole 2530 of the plunger 2500 while pressing the lip portion 2210 of the lip seal 2200 so that the lip portion 2210 is elastically deformed. Accordingly, the lip portion 2210 is separated from the plunger 2500, causing oil to flow through the path hole 2110 and the second communication hole 2560. The oil passing through the second communication hole 2560 is discharged to the outlet path 12 through the outlet port 2420.

When the pressure of oil is greater than the elastic force of the spring 2300, that is, in a high pressure condition, the plunger 2500 moves upward while compressing the spring 2300. Accordingly, the first communication hole 2530 of the plunger 2500 is disposed upward of the lip seal such that the first communication hole 2530 directly communicates with the path hole 2110 and the outlet port 2420. Accordingly, oil introduced through the inlet path 11 is directly discharged to the outlet port 2420 through the inner path 2520 and the first communication hole 2530, and thus a large amount of flow is provided.

As described above, the check valve 2000 according to an aspect of the present disclosure may provide a flow of oil according to a low pressure or a high pressure, and may provide a large amount of oil required depending on the external environmental factor, such as a low temperature condition, or the vehicle speed.

Meanwhile, when the pressure of oil discharged through the outlet path 12 become less than the elastic force of the spring 2300, the plunger 2500 is returned to the original position by the elastic restoration force of the spring 2300, and the lip portion 2210 comes into close contact with the plunger 2500 as shown in FIG. 3, thus performing a sealing function and preventing backflow of oil.

As is apparent from the above, the check valve according to the embodiment of the present disclosure is installed without positional limitation to perform a backflow prevention function according to a previously machined hydraulic circuit, so that the degree of freedom of design can be improved.

The check valve can be opened and closed according to the circumstance and driving condition, and provide a large amount of flow.

The check valve can improve stability and reactivity by controlling a flow of oil while guiding a movement of a plunger.

The above description of the present disclosure is made in relation to the embodiments. A person having ordinary skilled in the art should appreciate that other specific modifications may be easily made without departing from the technical spirit or essential features of the present disclosure and it should also be understood that all changes or modifications derived from the definitions and scope of the claims and their equivalents fall within the scope of the present disclosure.

What is claimed is:

1. A check valve installed in a bore of a modulator block having an inlet path and an outlet path to control a flow of oil in one direction, the check valve comprising:
    a valve housing provided with a path hole passing through a central portion thereof to have an upper end and a lower end thereof open to communicate with the inlet path and the outlet path, and a flange portion protruding from a circumference of an outer surface of the valve housing such that the valve housing is fixed to the bore;
    a plunger movably installed in the path hole while being elastically supported by a spring, and configured to open or close the path hole according to an up and down movement of the plunger; and
    a lip seal having a lip portion interposed between the plunger and the valve housing to prevent oil from flowing backward toward the inlet path from the outlet path,
    wherein the path hole is provided with a mounting groove, and the lip seal is coupled to the mounting groove such that the lip portion comes into contact with the plunger, and
    the lip portion is elastically deformed when oil flows from the inlet path to the outlet path, to allow a flow of oil, and
    wherein the plunger includes:
        a guide portion having an inner path that extends through an internal portion of the plunger, that has the path hole extending therethrough, and that communicates with the inlet path; and
        a support portion radially extending from the guide portion to be elastically supported by the spring and supported by a side of the open one end of the valve housing.

2. The check valve of claim 1, wherein the plunger is provided with a spring support groove to stably support the spring.

3. The check valve of claim 1, further comprising a filter member coupled to the other end between the open upper and lower ends of the valve housing to filter out foreign substance of oil introduced into the inlet path.

4. The check valve of claim 1, further comprising a cap fixed to the modulator block while closing the bore.

5. The check valve of claim 1, further comprising:
    a spring retainer coupled to one of the open upper and lower ends of the valve housing which is adjacent to the outlet path, and having an outlet port communicating with the outlet path.

6. The check valve of claim 5, wherein the spring retainer is provided with a spring support protrusion to stably support the spring.

7. The check valve of claim 5, wherein a coupling groove is formed in an outer circumferential surface of a side of the one end of the valve housing such that the spring retainer is calking-coupled to the coupling groove.

8. The check valve of claim 1, wherein the plunger is provided with a communication hole that selectively communicates the inlet path and the outlet path through the inner path according to up and down movement of the plunger.

9. The check valve of claim 8, wherein the communication hole includes a plurality of first communication holes formed along a circumference of a side surface of the guide portion to communicate with the inner path and a plurality of second communication holes formed along a circumference of an outer surface of the support portion to communicate with the path hole and the outlet path.

10. The check valve of claim 9, wherein when oil flowing from the inlet path to the outlet path has a low pressure, the oil is allowed to flow through the first communication hole and the lip portion, and when oil flowing from the inlet path to the outlet path has a high pressure, the plunger moves while compressing the spring such that the first communication hole communicates with the path hole and the outlet path.

* * * * *